United States Patent
Tsukada

(10) Patent No.: US 9,485,391 B2
(45) Date of Patent: Nov. 1, 2016

(54) METHOD, APPARATUS AND PROGRAM FOR RESTORING AND CORRECTING SURFACE REFLECTANCE WITH COLOR IMAGE PROCESSING

(75) Inventor: Masato Tsukada, Tokyo (JP)

(73) Assignee: NEC Corporation, Tokyo (JP)

( * ) Notice: Subject to any disclaimer, the term of this patent is extended or adjusted under 35 U.S.C. 154(b) by 639 days.

(21) Appl. No.: 12/867,583

(22) PCT Filed: Feb. 23, 2009

(86) PCT No.: PCT/JP2009/053146
§ 371 (c)(1),
(2), (4) Date: Aug. 13, 2010

(87) PCT Pub. No.: WO2009/104787
PCT Pub. Date: Aug. 27, 2009

(65) Prior Publication Data
US 2010/0328740 A1    Dec. 30, 2010

(30) Foreign Application Priority Data

Feb. 22, 2008    (JP) ................... 2008-041605

(51) Int. Cl.
| | | |
|---|---|---|
| G03F 3/08 | (2006.01) | |
| H04N 1/60 | (2006.01) | |
| G06T 7/40 | (2006.01) | |
| H04N 1/62 | (2006.01) | |

(52) U.S. Cl.
CPC ............. *H04N 1/6086* (2013.01); *G06T 7/408* (2013.01); *H04N 1/62* (2013.01)

(58) Field of Classification Search
None
See application file for complete search history.

(56) References Cited

U.S. PATENT DOCUMENTS

| | | | |
|---|---|---|---|
| 5,710,876 A * | 1/1998 | Peercy et al. ................. | 345/426 |
| 5,793,884 A * | 8/1998 | Farrell .......................... | 382/167 |
| 5,933,253 A | 8/1999 | Ito et al. | |
| 6,016,354 A * | 1/2000 | Lin ...................... | G06K 9/0061 |
| | | | 358/518 |
| 6,414,690 B1 * | 7/2002 | Balasubramanian | |
| | | et al. ........................... | 345/589 |
| 6,414,756 B1 | 7/2002 | Tsukada | |
| 6,549,653 B1 | 4/2003 | Osawa et al. | |

(Continued)

FOREIGN PATENT DOCUMENTS

| | | | |
|---|---|---|---|
| JP | 9-98298 A | 4/1997 | |
| JP | 9-181929 A | 7/1997 | |

(Continued)

OTHER PUBLICATIONS

Hosoi et al., "Face detection based on Generalized LVQ", Shingaku-Gihou, The Institute of Electronics, Information and Communication Engineers, vol. 102, No. 651, pp. 47-52 (2003).

(Continued)

*Primary Examiner* — Barbara Reinier
(74) *Attorney, Agent, or Firm* — Arent Fox LLP

(57) ABSTRACT

Spectral power distribution of an illumination is restored using color information in a region of the specific object in an input image and a pre-specified representative surface reflectance of the specific object. The surface reflectance in the region of the specific object is restored from the color information and the spectral power distribution of the illumination. The surface reflectance is corrected using three or more pre-specified reference surface reflectances of the specific object. The color in the region of the specific object is calculated from the spectral power distribution of the illumination and the corrected surface reflectance.

44 Claims, 11 Drawing Sheets

(56) References Cited

U.S. PATENT DOCUMENTS

| | | | |
|---|---|---|---|
| 6,560,358 B1 | 5/2003 | Tsukada | |
| 6,722,281 B2 * | 4/2004 | Yamamoto | 101/484 |
| 7,010,162 B2 | 3/2006 | Osawa et al. | |
| 7,016,075 B1 * | 3/2006 | Tsukada | 358/1.9 |
| 7,525,579 B2 * | 4/2009 | Katagiri | 348/234 |
| 8,855,371 B2 * | 10/2014 | Tsukada | H04N 1/62 345/426 |
| 8,923,575 B2 * | 12/2014 | Tsukada | G06K 9/00 382/119 |
| 2002/0104457 A1 * | 8/2002 | Brydges | B41F 33/0045 101/484 |
| 2003/0038954 A1 * | 2/2003 | Odagiri | H04N 1/6033 358/1.9 |
| 2006/0239548 A1 * | 10/2006 | George Gallafent | G06T 7/0081 382/164 |
| 2009/0141976 A1 * | 6/2009 | Tsukada | 382/167 |

FOREIGN PATENT DOCUMENTS

| | | | |
|---|---|---|---|
| JP | 10-229499 A | 8/1998 | |
| JP | 11-096333 A | 4/1999 | |
| JP | 2000-113174 A | 4/2000 | |
| JP | 2001-092956 A | 4/2001 | |
| JP | 2001311666 A | 11/2001 | |
| JP | 2003-317084 A | 11/2003 | |
| JP | 2004-045189 A | 2/2004 | |
| JP | WO2007/007786 * | 1/2007 | |
| JP | WO2007/007788 * | 1/2007 | H04N 9/73 |
| WO | WO-2007/007786 A1 | 1/2007 | |

OTHER PUBLICATIONS

Johji Tajima, "Image Engineering Series 10, Color Image Duplication, Fundamentals of Color Management", Maruzen KK, pp. 33-39 (Sep. 30, 1996).

* cited by examiner

INPUT IMAGE

METHOD, APPARATUS AND PROGRAM FOR RESTORING AND CORRECTING SURFACE REFLECTANCE WITH COLOR IMAGE PROCESSING

TECHNICAL FIELD

Reference to Related Application

This application is based upon and claims the benefit of the priority of Japanese patent application No. 2008-041605 filed on Feb. 22, 2008, the disclosure of which is incorporated herein in its entirety by reference thereto.

This invention relates to image processing for a color image. More particularly, it relates to a method, an apparatus and a program for processing a color image according to which color correction as well as desired color reproduction of an article in a color image actually photographed by a color image pickup device may be achieved with an improved texture.

BACKGROUND

As a technique for enhancing image texture of a color image, photographed by a color image pickup device, such a technique has been proposed in which the color of a specific object in a color image, such as skin color, green of grasses or trees, or blue sky, is made to approach to a memory color of the object, thereby reproducing the desired color.

In Patent Document 1, for example, discloses such technique. In Patent Document 1 a representative color is extracted from an object region contained in the image. The representative color is compared with a preset center color of correction to determine an RGB correction parameter. In correcting the color of each pixel, the application strength of the correction parameter is controlled in dependence upon the distance of the color of the pixel from the center color. Specifically, the hue, saturation and luminance values are obtained on transformation from the RGB values that represent the color information of each pixel of a color image. The distance in the color space between the color of each pixel and the center color of correction is then calculated. The correction strength is then adjusted in dependence upon the distance calculated to emphatically correct the color of the object.

In this technique, color correction is made on the basis of addition/subtraction of the correction parameter in the RGB color space. For example, if the color is the skin color of a face of a human being, the RGB correction values are calculated on a per pixel basis, based on the distance between the RGB color and the center color of correction. If the face area in its entirety is to be bright, the correction parameter proportionate to a distance between the RGB color and the center color of correction is added to or subtracted from the RGB value of each pixel in the entire face area.

Patent Document 3 shows an apparatus and a method for color correction in which, in correcting the spectral colors of image data, the spectral colors are transformed into those in the color space of a lower dimension than the original dimension, so that color correction may be made in the color space of the lower dimension. The spectral colors of the proper order may thus be obtained in the lower diminution. In an arrangement of Patent Document 4, the spectral power distribution characteristic of the original reference white color is restored from the color temperature of the original reference white color which is the reference white color of the original color space. A spectral power distribution characteristic of a target reference white color is restored from the color temperature of the target reference white color which is the reference white color of the target color space. The surface reflectance of an optional color in the original color space is restored by exploiting tristimulus values of the optional color, the optical distribution characteristic of the original reference white color and the color matching function of the human being. The tristimulus values, representing the color in the target color space, are then found from the surface reflectance restored, the spectral power distribution characteristic of the target reference white color restored and from the color matching function of the human being. Patent Document 5 shows an arrangement in which a representative color of a specific object is extracted, and an optimum color correction parameter is set for the representative color extracted. In this manner, color correction may automatically be made on a crucial article in a natural image photographed under a variety of illumination environments. It is noted that the subject-matter of any of the Publications 3 to 5 is entirely different from that of the present invention as hereinafter described.

[Patent Document 1]
JP Patent 3264273 (paragraphs 0036 to 0045)
[Patent Document 2]
JP Patent Kokai Publication No. JP-P2003-317084A (paragraphs 0019 to 0021)
[Patent Document 3]
JP Patent Kokai Publication No. JP-P2004-45189A
[Patent Document 4]
JP Patent Kokai Publication No. JP-A-10-229499
[Patent Document 5]
JP Patent Kokai Publication No. JP-P2001-92956A
[Non-Patent Document 1]
T. HOSOI et al., 'Face detection based on Generalized LVQ', Shingaku-Gihou, The Institute of Electronics, Information and communication Engineers, 2003, Vol. 102, No. 651, pp. 47-52
[Non-Patent Document 2]
Johji TAJIMA, 'Image Engineering Series 10, Color Image Duplication, Fundamentals of Color Management', Maruzen K K, Sep. 30, 1996, pp. 33-39

SUMMARY

The disclosures of the Patent Documents 1 to 5 and the Non-Patent Documents 1 and 2 are to be incorporated by reference herein. The following is an analysis of the related techniques by the present invention.

In the color image processing technique, employing RGB of color image data and three attributes of colors, namely, hue, saturation and luminance, such as that disclosed in Patent Document 1, there are cases where a texture proper to an object is deteriorated.

The reason is that, when the color of an object in an image is corrected to a brighter color, it may occur that a color component of an inherently high pixel value, such as red, is saturated, while the correction parameter is added to or subtracted from the other color components, namely, green and blue. If this processing is applied to the entire object region, the variance of the pixel value or the color information in the object region becomes smaller, thus leading to the eventually deteriorated apparent texture of the object region.

Hence, the necessity arises for color image processing in which it is possible to suppress deterioration of the texture in an object region in a color image.

It is therefore an object of the present invention to provide a method, an apparatus, and a program for processing a color image which may realize desired color reproduction of a specific object in a color image photographed by a color image pickup device and may maintain or improve the texture of the object.

Although not limited thereto, the invention may be summarized substantially as follows:

In accordance with one aspect of the present invention, there is provided a color image processing method comprising:

restoring a surface reflectance in a region of a specific object in an input image from color information of the specific object in the input image and from restored information on spectral power distribution of an illumination under which the input image is photographed; and correcting the surface reflectance using a reference surface reflectance of the specific object to perform color correction to the specific object in the input image to generate an output image.

The present invention provides a color image processing method, in which an input image is corrected to generate an output image, the method comprising the steps of:

restoring spectral power distribution of an illumination, using color information in a region of a specific object in the input image and a pre-specified representative surface reflectance of the specific object;

restoring a surface reflectance in the region of the specific object, based on the color information and on the spectral power distribution of the illumination;

correcting the surface reflectance, using a predetermined number of reference surface reflectances of the specific object; and calculating the color in the region of the specific object from the spectral power distribution of the illumination and from the surface reflectance corrected.

The present invention also provides a color image processing method in which an input image is corrected to generate an output image, the method comprising the steps of:

restoring spectral power distribution of an illumination, using the color information in a region of a specific object in the input image and a pre-specified representative surface reflectance of the specific object;

calculating a matrix that corrects a surface reflectance in the object in the input image by exploiting pre-specified three or more reference surface reflectances of the specific object; and finding a correction equation which is based on linear calculation for correcting the color information in the object to correct the color information in the object.

Further, in the color image processing method according to the present invention, a region of the specific object may be detected from the input image to extract the color information.

Further, in the color image processing method according to the present invention, in case the corrected color information in the object is outside the color range of an image output device, such color information may be corrected so as to be inside the color range of the image output device.

In accordance with another aspect of the present invention, there is provided a color image processing apparatus which corrects an input image to generate an output image, in which the apparatus comprises:

an object representative surface reflectance storing memory that stores pre-specified three or more representative surface reflectances of a specific object;

an illumination spectral power distribution restoration section that restores the spectral power distribution of an illumination, using the color information in a region of the specific object in the input image and the three or more representative surface reflectances of the specific object;

an object region surface reflectance restoration section that restores a surface reflectance in a region of the specific object from the color information and from the spectral power distribution of the illumination;

an object reference surface reflectance storing memory that stores a pre-specified reference surface reflectance of the specific object;

an object region surface reflectance correction section that corrects the surface reflectance of the region of the specific object using the pre-specified reference surface reflectance of the specific object; and an object region reproduction color calculation section that calculates the color in the region of the specific object from the spectral power distribution of the illumination and from the surface reflectance corrected.

The present invention also provides a color image processing apparatus that corrects an input image to generate an output image, in which the apparatus comprises:

an object representative surface reflectance storing memory that stores a pre-specified representative surface reflectance of a specific object;

an illumination spectral power distribution restoration section that restores the spectral power distribution of an illumination, using the color information in a region of the specific object in the input image and the representative surface reflectance of the specific object;

an object reference surface reflectance storing memory that stores a pre-specified three or more reference surface reflectances of the specific object;

an object region surface reflectance correction matrix calculation section that calculates a matrix that corrects a surface reflectance of the object region, the surface reflectance correction matrix calculation section calculating the matrix by exploiting the pre-specified three or more reference surface reflectances of the specific object; and an object region reproduction color correction section that corrects the reproduction color of the object region, the reproduction color correction section finding a correction equation that corrects the color information in the object in the input image, based on linear calculation to correct the color information in the object.

In the color image processing apparatus according to the present invention, there is also provided an object region detection section that detects region of a specific object from an input image to extract the color information.

In the color image processing apparatus according to the present invention, there is also provided an image output device color information storing memory that stores therein the color information of the image output device and a color correction section for an image output device, which if the corrected color information is outside the color range of the image output device, corrects the color information so as to be inside the color range of the image output device.

According to the present invention, there is provided a color image processing program which corrects an input image to generate an output image, the program causing a computer to execute:

a processing that restores spectral power distribution of an illumination, using color information in a region of a specific object in the input image and a pre-specified representative surface reflectance of the specific object;

a processing that restores a surface reflectance in the region of the specific object from the color information and the spectral power distribution of the illumination;

a processing that corrects the surface reflectance, using pre-specified three or more reference surface reflectance of the specific object; and a processing that calculates the color in the region of the specific object from the spectral power distribution of the illumination and from the surface reflectance corrected.

According to the present invention, there is also provided a color image processing program which corrects an input image to generate an output image, the program causing a computer to execute:

a processing that restores spectral power distribution of an illumination, using color information in a region of a specific object in the input image and a pre-specified representative surface reflectance of the specific object;

a processing that calculates a matrix which corrects a surface reflectance of the specific object in the input image by exploiting a pre-specified reference surface reflectance of the specific object; and a processing that finds a correction equation that corrects the color information in the object in the input image, based on linear calculation to correct the color information in the object.

The color image processing program according to the present invention may cause a computer to execute the processing of detecting a region of a specific object from an input image to extract the color information.

The program according to the present invention may further cause a computer to execute the processing in which, if the corrected color information in the object is outside the color range of the image output device, the color information is corrected so as to be within the color range of the image output device. According to the present invention, there is provided a computer-readable recording medium that stores the above described program.

According to the present invention, it is possible to realize desired color reproduction in a specific object in a color image photographed by a color image pickup device to maintain or improve the texture.

Still other features and advantages of the present invention will become more readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

Exemplary embodiments of the present invention will now be described. According to the present invention, in correcting the color of a specific object, correction is not made by RGB that makes up image data, nor by three attributes of the color. Instead, the reproduction color is calculated by correcting the color so that the distribution of surface reflectance which expresses the color of the specific object, will be made to approach to the distribution of preset reference surface reflectance of the object. By so doing, it becomes possible to suppress deterioration of the variance of the reproduction color following the color correction.

The present invention renders it possible to solve the problem that, with color image processing employing three color attributes, namely, hue, saturation and luminance, the texture proper to an article tends to be deteriorated. It is thus possible to realize desired color reproduction of an object in a color image, photographed by a color image pickup device, without deteriorating its texture. Exemplary embodiments of the present invention will now be described.

Figure 1:
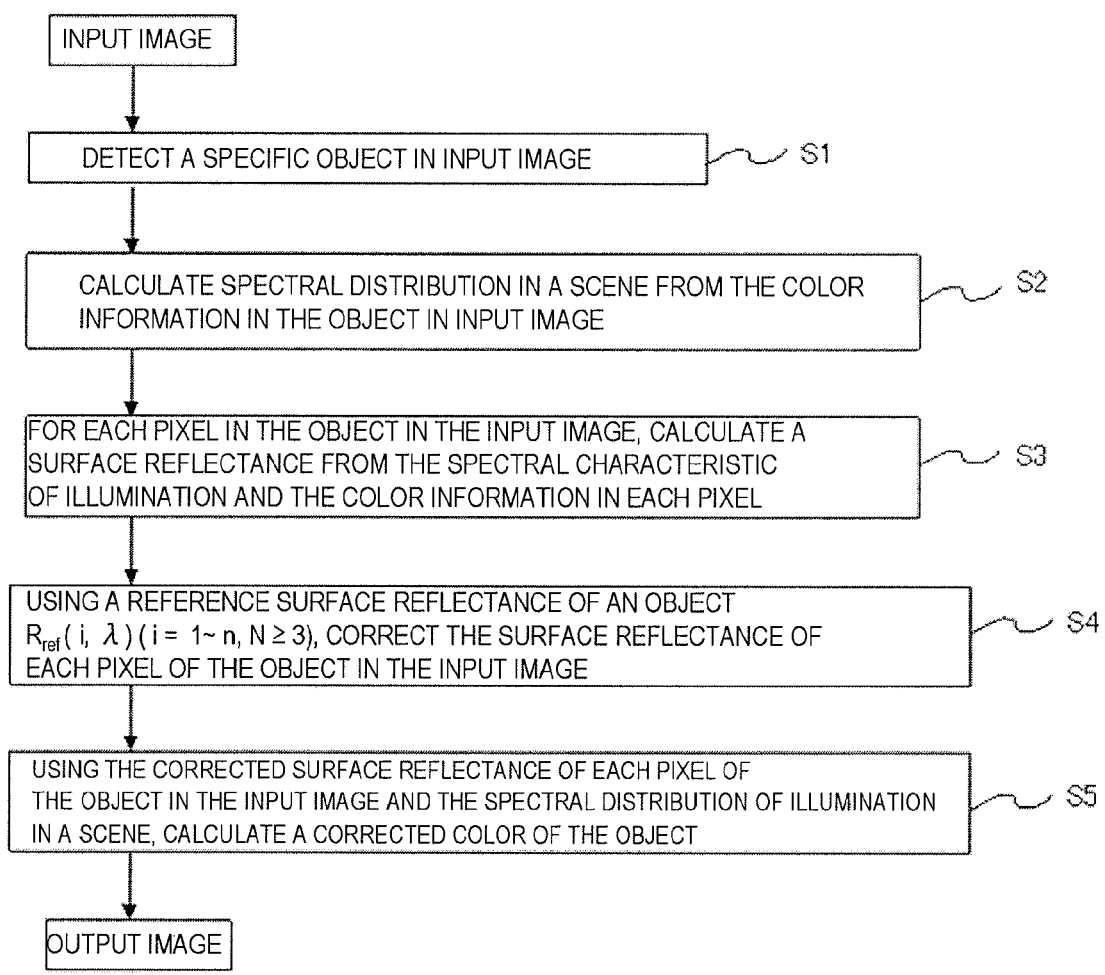
FIG. 1 is a flowchart for illustrating the sequence of operations of Example 1 of the color image processing method according to the present invention.

FIG. 1 is a flowchart for illustrating the color image processing method according to a first exemplary embodiment of the present invention. The color system for the image is the RGB color system. That is, the color of the image is expressed by the combination of red (R), green (G) and blue (B), with the color information being denoted the color information RGB for convenience in explanation. It is to be noted however that the present invention may be applied to a color systems other than the RGB system as well.

To improve the texture of a specific object in an optionally given color image, the reproduction color in each pixel of the object in the color image is re-calculated.

There is no particular limitation to the specific object, provided that, even though an instance of the object is not the same from one object to another, that is, there is an individual difference, an object in a color image may be determined to be an instance of the object by estimation from features obtained from the color image. Such estimation may be based on universality of approximate color information and texture of the object.

Initially, a specific object is automatically detected from an input image (step S1).

The specific object is detected from the input image using e.g., the color information or texture. The following description is for the case where the specific object is a face of a human being. In case the specific object is the face of the human being, the face area is detected using shape features, such as eyes, nose or mouth.

As a technique for detecting the face area, the method for detecting the face, disclosed in Non-Patent Document 1, for example, may be utilized. The technique is a face detection method comprised of the combination of an image-based type exploiting the generalized learning vector quantization and a feature-based type in which eyes are detected.

As a method for detecting a face area from an input image, the method for detecting eyes from an image, as disclosed in Patent Document 2, may be used. That is, if the positions of the eyes are detected from an input image, the face area would be estimated with ease.

In the above mentioned two techniques, face detection is generally by utilizing monochromatic information. However, face area detection would be improved in detection accuracy by adding giving a decision on whether or not the face area, which is the result of the detection, is of a skin color.

In the method for deciding the skin color, the technique of using an image histogram, disclosed in Patent Document 1, may be used. The method for face detection may use techniques different from the above mentioned two techniques which are given only for illustration and are not intended to restrict the invention.

In the above description, the object to be automatically detected from the optionally given input image is a face of a human being. However, the object may be different from the face of the human being. If the object other than the face is to be detected automatically, such a method may be used in which the visual feature information of an object registered beforehand is compared with the visual feature information of image data, thereby automatically detecting the object.

Next, the color information of an illumination under which an input image was photographed is restored from the color information in the object in the input image (step S2).

In this step, the color information of the object in the color image as well as the surface reflection characteristic proper to the object is utilized to restore the color information, namely, the spectral power distribution characteristic, of the illumination which is presumed to be used in photographing the input image.

Initially, the color information of the area of the object, automatically detected from the input image, is found.

Figure 2:
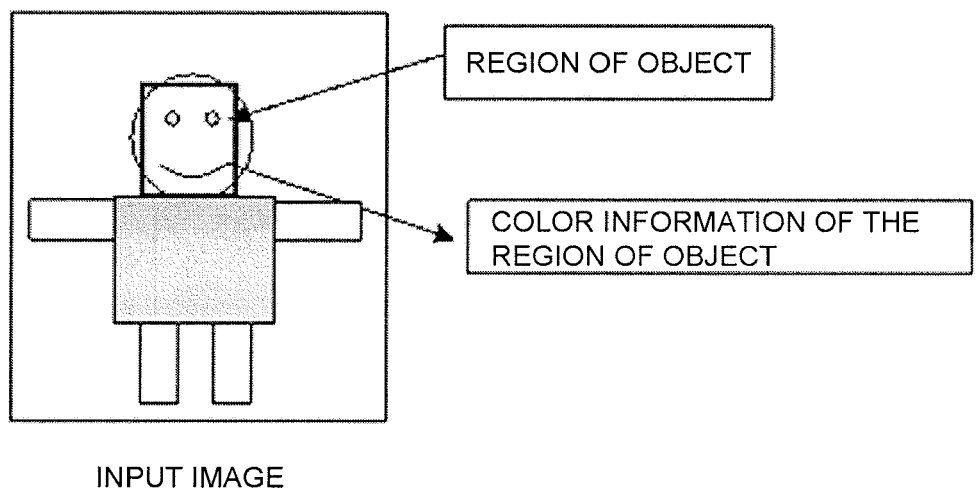
FIG. 2 is a diagram illustrating the processing for automatically detecting a region of an object in an input image to find the color information.

FIG. 2 is a schematic diagram illustrating the processing for automatically detecting a region of the object in the input image to find the color information. Any one out of a mean color, center color (median color) and the most frequent color (mode) of pixels present in the area of the object may be used as the color information of the object region.

In the step S2, the color information RGB of the area of the object is acquired. Then, based on the so acquired color information RGB, tristimulus values X, Y and Z of the XYZ color system are found.

In the following, it is presumed that the chromaticity of RGB phosphors of the input image and the chromaticity of the white color are specified at the outset and that the relationship between the RGB data and the light emission intensity of a display device is linear.

In this case, the relationship between the RGB of the input image and the tristimulus values X, Y and Z may be expressed by the following equation (1)

$$\begin{pmatrix} X \\ Y \\ Z \end{pmatrix} = RX \begin{pmatrix} R \\ G \\ B \end{pmatrix} \quad (1)$$

where RX is a 3×3 transformation matrix.

This transformation matrix RX may uniquely be calculated if once the chromaticity of the RGB phosphors and the chromaticity of the while color are determined.

As a method for calculating the transformation matrix RX, the technique shown for example in Non-Patent Document 2 may be used. In case the color image display device, currently used, is a sRGB display, the transformation matrix provided for by the International Electrotechnical Commission (IEC) may be used. An XYZ value for black may also be added as an offset term to the equation (1).

An observation equation for restoration of the spectral power distribution, which equation stands for the color information of the illumination, under which the input image is photographed, is generated from the tristimulus values X, Y and Z and the surface reflectance proper to the object region in the image obtained in the equation (1).

The illumination under which the input image is photographed is an illumination (light source) used for illuminating the object in photographing the input image.

The tristimulus values X, Y and Z, representing the color of the object based on the XYZ color system, may be expressed, from the surface reflectance of the object, the spectral power distribution of the illumination used for illuminating the object, and the color matching function of the visual sense of the human being, in accordance with the following equations (2):

$$X = \int I(\lambda) R(\lambda) x(\lambda) d\lambda$$

$$Y = \int I(\lambda) R(\lambda) y(\lambda) d\lambda$$

$$Z = \int I(\lambda) R(\lambda) z(\lambda) d\lambda \quad (2)$$

where $\lambda$ is a wavelength, $I(\lambda)$ is a spectral power distribution of the illumination and $R(\lambda)$ is a surface reflectance of the object. $x(\lambda)$, $y(\lambda)$ and $z(\lambda)$ are color matching functions, which are known functions. The integration is carried out in a wavelength range of visible light.

If now the tristimulus values X, Y and Z, calculated in accordance with the equation (1), are substituted into the left side of the equation (2), the equation (2) becomes the observation equation of $R(\lambda)$ and the spectral power distribution of the illumination $I(\lambda)$, both of which are unknown.

However, in the current state, it is not possible to calculate $I(\lambda)$ or $R(\lambda)$, which are continuous functions regarding the wavelength, from the equation (2).

If the surface reflectance $R(\lambda)$, indicating the object color, can be limited or determined at the outset, even though the surface reflectance is corrupted with error to a more or less extent, $R(\lambda)$ can be handled as being of a known value. The equation (2) then becomes an observation equation composed just of $I(\lambda)$.

Figure 3:
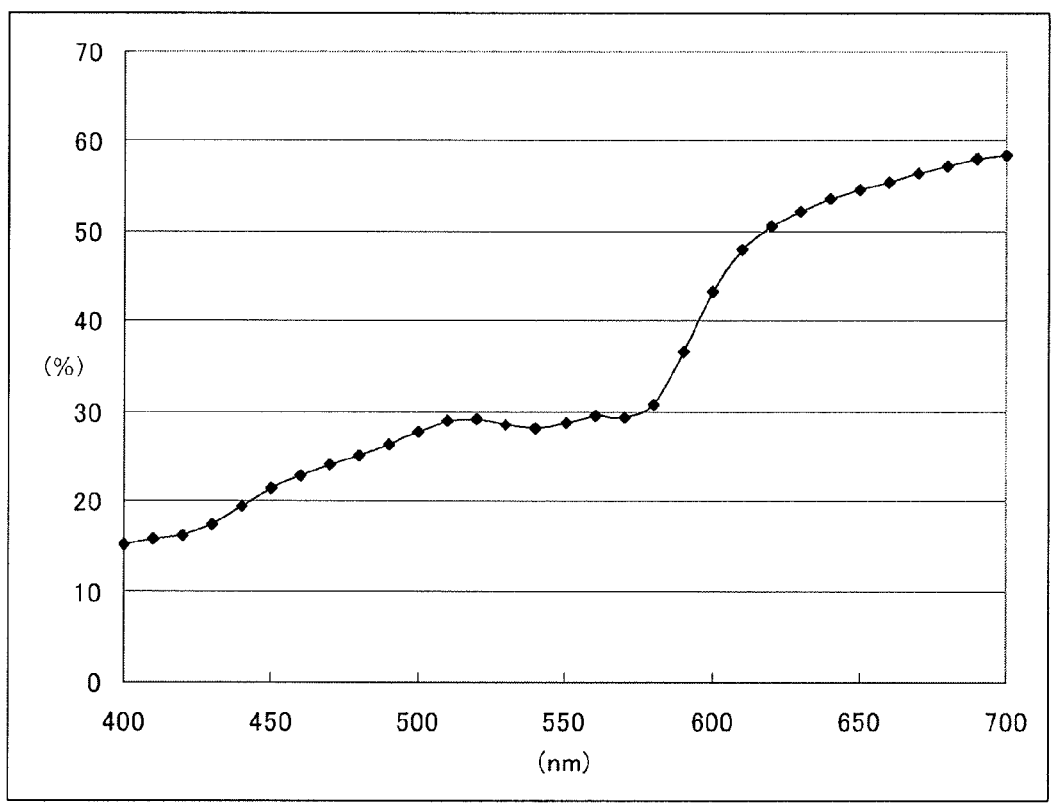
FIG. 3 is a diagram schematically illustrating the processing for automatically detecting the object region to find the color information.

For example, if the object is a face of a Japanese, the surface reflectance of a face area of a Japanese, having an average skin color, shown for example in FIG. 3, may be used as $R(\lambda)$ of the equation (2).

Even if the object is not a face, it is sufficient that a mean value of the surface reflectance, obtained by measuring and averaging a plurality of the objects, or the surface reflectance of an object, selected as being of the mean or representative color, is found at the outset, and the surface reflectance, thus found, is substituted in $R(\lambda)$ of the equation (2).

From the equation (2), which is an observation function for the spectral power distribution $I(\lambda)$ of an illumination, the spectral power distribution of the illumination $I(\lambda)$ is represented by waveforms of infinite dimensions in a range of visible light. Hence, $I(\lambda)$ may not be analytically calculated from the observation equation (2).

The CIE daylight is a light source for colorimetry prescribed by CIE (Commission internationale de l'éclairage) in accordance with the relative spectral power distribution, and may optimally be approximated by a linear sum of a mean and two principal components, in a well-known manner.

Figure 4:
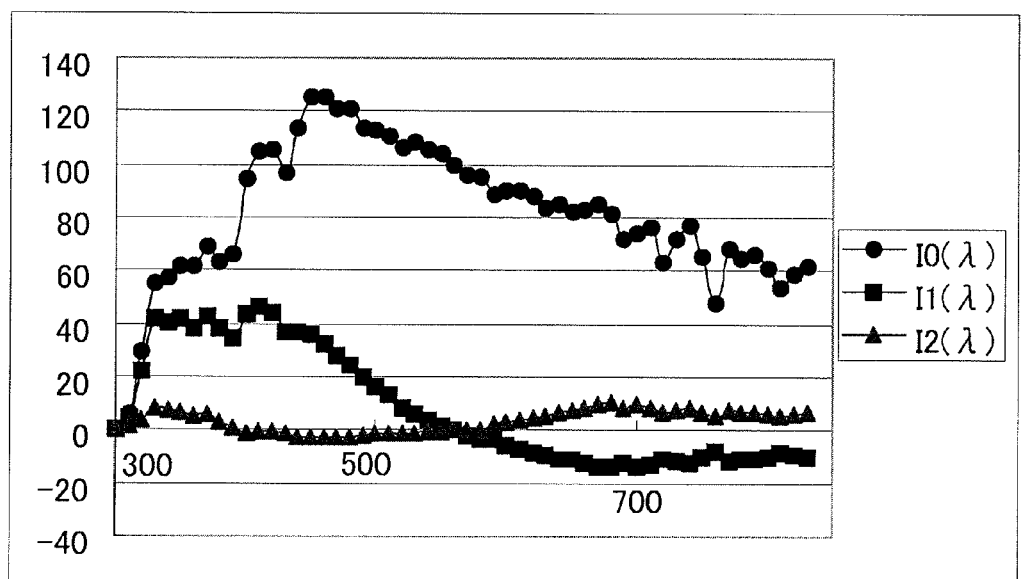
FIG. 4 is a graph showing a mean or average color as well as first and second principal component vectors of CIE daylight.

FIG. 4 is a graph showing a mean and the first and second principal component vectors of the CIE daylight.

The spectral power distribution $I(\lambda)$ of the illumination may thus be expressed by the following equation:

$$I(\lambda)=I_0(\lambda)+a_1I_1(\lambda)+a_2I_2(\lambda) \quad (3)$$

$I_i(\lambda)$ in the equation (3) (i=0~2) are a mean and the base vectors of the illumination shown in FIG. 4.

It is noted that $a_i$ (i=0~2) represents the weighting coefficient of each base vector, and represents characteristic parameters representing the color of the illumination.

By substituting $I(\lambda)$ of the equation (3) into the equation (2), we obtain an order-two degree-one simultaneous equation concerning unknown characteristic parameters $a_1$ and $a_2$ that express the color of the illumination. Hence, $a_1$ and $a_2$ may readily be calculated from the simultaneous equation.

The spectral power distribution $I(\lambda)$ of the illumination may be obtained by substituting the characteristic parameters $a_1$ and $a_2$, representing the color of the illumination obtained, into the equation (3).

The spectral power distribution of the illumination, obtained by the above sequence of operations, is taken to be the spectral power distribution $I(\lambda)$ of the illumination under which the input image is photographed.

Next, the surface reflectance of the specific object in the input image is restored for each pixel of the specific object (step S3).

From the RGB values in an optional pixel in the region of the specific object, the tristimulus values X, Y and Z are calculated in accordance with the equation (1). The so calculated values are then substituted into the left side of the equation (2).

The spectral power distribution $Iorg(\lambda)$ of the illumination, at the time when the input image calculated in the step S2 was photographed, is substituted into the right side of the equation (2). The equation (2) then becomes the observation equation relating to the surface reflectance $R(\lambda)$ in the pixel of the region of the specific object.

Similarly to the spectral power distribution of the illumination, the surface reflectance of the specific object is expressed by waveforms of an infinite number of dimensions in the range of the visible light. Hence, the surface reflectance of the specific object may not be analytically calculated from the observation equation (2).

Hence, the surface reflectance of the specific object is also modeled using a linear model of a finite number of dimensions represented by the weighted sum of the base vectors of lower dimensions:

$$R(\lambda)=r_0(\lambda)+b_1r_1(\lambda)+b_2r_2(\lambda)+b_3r_3(\lambda) \quad (4)$$

In the above equation, $r_i(\lambda)$ (i=1~3) are the base vectors obtained on principal component analysis of a collection of a larger number of surface reflectances of objects. Specifically, $r_i(\lambda)$ (i=1~3) represent vectors of a mean and first to third component vectors. These are all of known values.

$b_i$ (i=1~3) are weighting coefficients of the respective base vectors, and represent unknown characteristic parameters expressing the color of an object.

Figure 5:
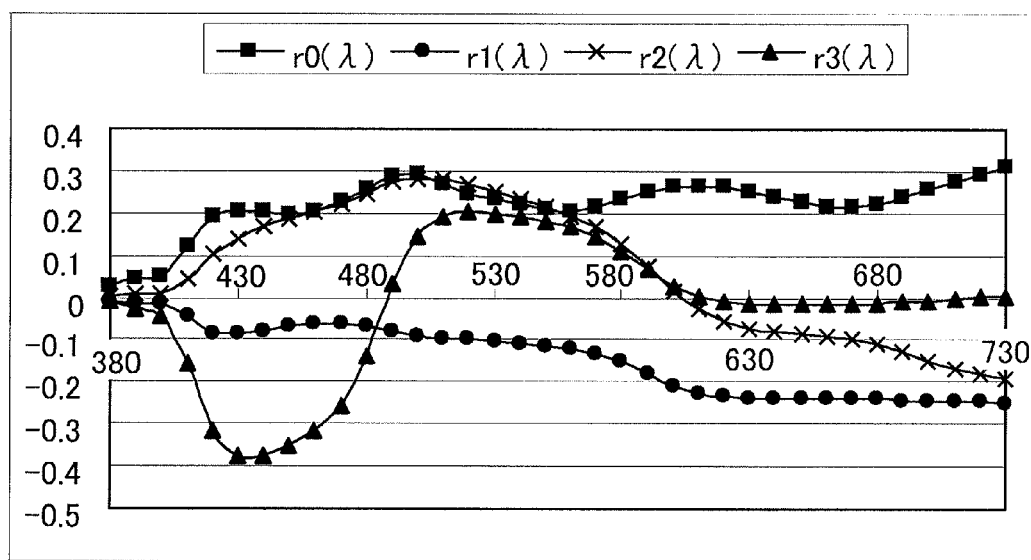
FIG. 5 is a graph showing examples of base vectors obtained on collecting a plurality of surface reflectances of an object and subjecting them to principal component analysis.

FIG. 5 shows a first exemplary embodiment of base vectors obtained on principal component analysis of the surface reflectances of articles. It is also possible to collect a larger number of surface reflectances of specific objects and subject them to principal component analysis to generate base vectors.

If the surface reflectance of a specific object may be expressed as indicated by the equation (4), the unknown characteristic parameters $b_1$ to $b_3$ may be found by the following equation (5), which is a simultaneous linear equation with three unknowns (5) obtained on substituting the equation (4) into the observation equation (2).

$$\begin{pmatrix} b_1 \\ b_3 \\ b_1 \end{pmatrix} = \begin{pmatrix} M(x,Y_1) & M(x,Y_3) & M(x,Y_1) \\ M(y,Y_1) & M(y,Y_3) & M(y,Y_1) \\ M(z,Y_1) & M(z2Y_1) & M(z,Y_1) \end{pmatrix}^{-1} \begin{pmatrix} X-M(x,Y_0) \\ Y-M(x,Y_0) \\ Z-M(x,Y_0) \end{pmatrix} \quad (5)$$

In the above equation, $M(x,r_i)$ (i=1~3) is a term of integration of $\int I(\lambda)r_i(\lambda)x(\lambda)d\lambda$. The same may apply for y and z as well.

The surface reflectance in an optional pixel in an object region may be found by substituting the characteristic parameters $b_i$ (i=1~3) into the equation (4). The characteristic parameters $b_i$ (i=1~3) obtained by the equation (5), represent the color of the object.

The surface reflectance of each pixel in the object of the input image is corrected by exploiting the reference surface reflectance of the object (step S4).

The surface reflectance of each pixel of the object in the input image, calculated in the step S3, is corrected based on a reference surface reflectance that has been set so as to reproduce the desirable object color.

The reference surface reflectance of an object denotes such surface reflectance for which the object will present an optimum desirable color (brightness, saturation and hue) in a color image obtained on photographing under a standard illumination.

Figure 11:
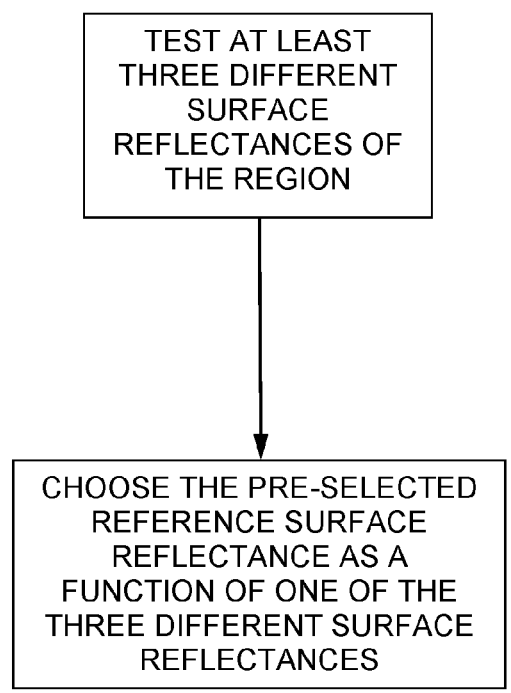
FIG. 11 is a flowchart illustrating a subjective evaluation experiment of the color image processing method according to the present invention.

The reference surface reflectance depends on the subjectivity of the human being and hence may not be uniquely defined. However, it may be found at the outset by a carrying out a subjective evaluation experiment as shown, for example, in FIG. 11. For example, the color of an object in an image is varied using an image processing tool to evaluate the image texture of the resulting images. The above mentioned steps S2 and S3 may then be applied to the sole image determined to be the best among those images to find the reference surface reflectance of each pixel in the object region.

It is noted that three or more of the reference surface reflectances are pre-selected from the object region. For example, the reference surface reflectances of the colors of the pixels corresponding to the mean, median color and the color that occurs most often (mode color) in the object region may be taken to be the reference surface reflectances of the object Rref(i, λ) (i=1~n, n≥3).

Also, in the object region, the colors of the highest luminance, the color of the lowest luminance, the color of the highest saturation and the color of the lowest saturation may be analyzed. The color distribution in the object region may also be analyzed. The surface reflectance of the color at each end of a given hue may also be used as the reference surface reflectance of the object Rref(i, λ) (i=1~n, n≥3).

Furthermore, if the outer shape feature of an object in an input image may be exploited, the surface reflectance for the color of a region of the object in register with such shape feature may be made the reference surface reflectance of the object Rref(i, λ) (i=1~n, n≥3). For example, if the object is a face of the human being, a cheek, corner of the eye or forehead may be set as the feature area.

A average color of pixels present in a region of some extent in one or more of the feature areas may be found, and the surface reflectance for the average color may then be calculated. The so calculated surface reflectance may be used as the reference surface reflectance of the object Rref(i, λ) (i=1~n, n≥3).

By the above technique, three or more reference surface reflectances may be obtained from the object region.

The surface reflectance of each pixel in the object in the input image is corrected based on the reference surface reflectance of the object Rref(i, λ) (i=1~n, n≥3) configured to optimally reproduce the object color.

The variance of the reproduction color in the object region is not to be reduced. This may be brought about due to correction of the surface reflectances to a single surface reflectance value in the object region.

The reason is that, if the variance of the color in the object region is reduced, it may sometimes occur that the texture is deteriorated.

In the present exemplary embodiment, the color of the object in the image is corrected by correcting the characteristic parameters $b_i$ (i=1~3) that compose the surface reflectance calculated for each pixel in the object region.

The following is an example of an equation for correction for the characteristic parameters $b_i$ (i=1~3):

$$\begin{pmatrix} b'_1 \\ b'_2 \\ b'_3 \end{pmatrix} = \begin{pmatrix} m_{11} & m_{12} & m_{13} \\ m_{21} & m_{22} & m_{23} \\ m_{31} & m_{32} & m_{33} \end{pmatrix} \begin{pmatrix} b_1 \\ b_2 \\ b_3 \end{pmatrix} \quad (6)$$

The characteristic parameters $b_i'$ (i=1~3) are post-correction characteristic parameters.

The 3×3 matrix is a correction matrix. An element $m_{ij}$ (i, j=1~3) of the matrix may be calculated as follows:

For each of the three or more reference surface reflectances Rref(i, λ) (i=1~n, n≥3) for the object, obtained from the outset, the color having the corresponding property is found in the object region in the input image, namely, a mean color is found if the reference surface reflectance is for a mean color, for instance. The value of the surface reflectance for each such color is found.

That is, if the first reference surface reflectance Rref(1, λ) is the surface reflectance for the mean color of the object region in the image, determined to be most desirable, as described above, the surface reflectance R(1, λ) for the mean color in the object region in the input image is found.

The characteristic parameter of Rref(1, λ) is set to be $b_{r1,i}$ (i=1~3), and the characteristic parameter of R(1, λ) is set to be $b_{1,i}$ (i=1~3).

The mean color in the object region in the input image is corrected so as to be the center color in the object region in the image determined to be desirable. Then, $b_{r1,i}$ (i=1~3), the characteristic parameter of Rref(1, λ), is substituted into the characteristic parameter $b_i'$ (i=1~3) on the left side of the equation (6), and $b_{1,i}$ (i=1~3), the characteristic parameter of R(1, λ), is substituted into the characteristic parameter $b_i$ (i=1~3) on the right side of the equation (6).

The equation (6) then becomes a simultaneous equation concerning unknown elements $m_{ij}$ (i, j=1~3).

The same processing is carried out for the remaining ones of the three or more colors in the object. The solution for the unknowns $m_{ij}$ (i, j=1~3) may be obtained from the relationship between the numbers of the equations and the unknowns, and hence the correction matrix of the equation (6) may be obtained.

Figure 6:
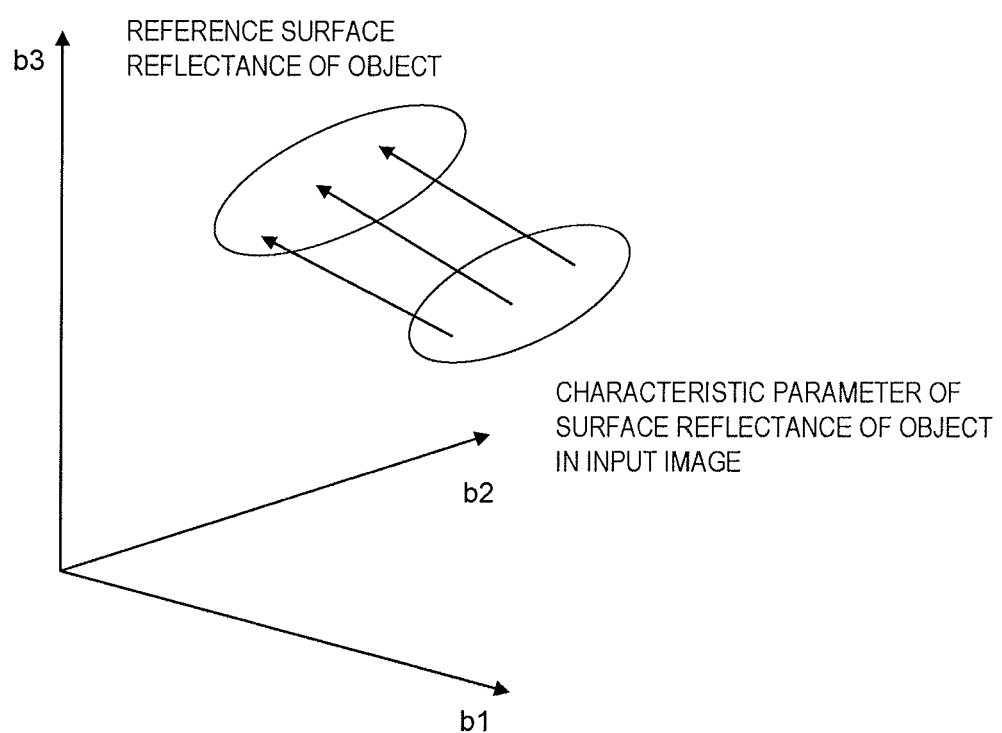
FIG. 6 is a diagram illustrating correction in a space of characteristic parameters $b_i$ (i=1~3) regarding the color of an object region.

FIG. 6 shows the relationship of the above correction in the space of the characteristic parameters $b_i$ (i=1~3), for the three colors in the object region.

It is seen from FIG. 6 that, by maintaining the distribution of the characteristic parameters in the area of a specific object in an input image at the distribution of the characteristic parameters in the reference surface reflectance that might bring about a desirable color reproduction, it becomes possible to suppress variations (bias or lowering) of color variance. There is thus no risk of the color texture being lost as a result of the correction.

If conversely the distribution of the characteristic parameters in the region of the specific object in the input image exhibits marked variance, adjustment may be made to the variance of the distribution of the characteristic parameters in the reference surface reflectance. This may advantageously prevent the texture from being deteriorated due to excessively large values of color variance.

The correction matrix of the equation (6) may be applied to the characteristic parameters $b_i$ (i=1~3) that compose the surface reflectance of each pixel in the object in the input image to calculate the post-correction characteristic parameters. The so calculated post-correction characteristic parameters are then substituted into the equation (4) to find the corrected surface reflectance of each pixel in the object in the input image.

Then, using the corrected surface reflectance of each pixel in the object in the input image, and the spectral power distribution I(λ) of the illumination under which the input image is photographed, the corrected color of each pixel in the object of the input image is calculated (step S5).

In calculating the corrected color of each pixel in the object in the input image, tristimulus values X', Y' and Z' are calculated with the use of the equation (2). A matrix XR, an inverse matrix of the matrix RX of the equation (1), is then calculated to yield the corrected R', G' and B':

$$\begin{pmatrix} R' \\ G' \\ B' \end{pmatrix} = XR \begin{pmatrix} X' \\ Y' \\ Z' \end{pmatrix} \quad (7)$$

An image corresponding to the input image, the color of the object region of which has been corrected as described above, may now be output as an output image.

The foregoing explanation has been made for the case where the device-dependent colors in the input and output images are RGB colors. If the device-dependent colors are different from the RGB colors, such as CMY or CMYK, the color correction method of the present invention may be applied provided that the relationship of correspondence between the tristimulus values X, Y and Z of the non-device-dependent colors and the device-dependent colors is maintained. The device-dependent color means the color space dependent on the device of the output destination.

Figure 7:
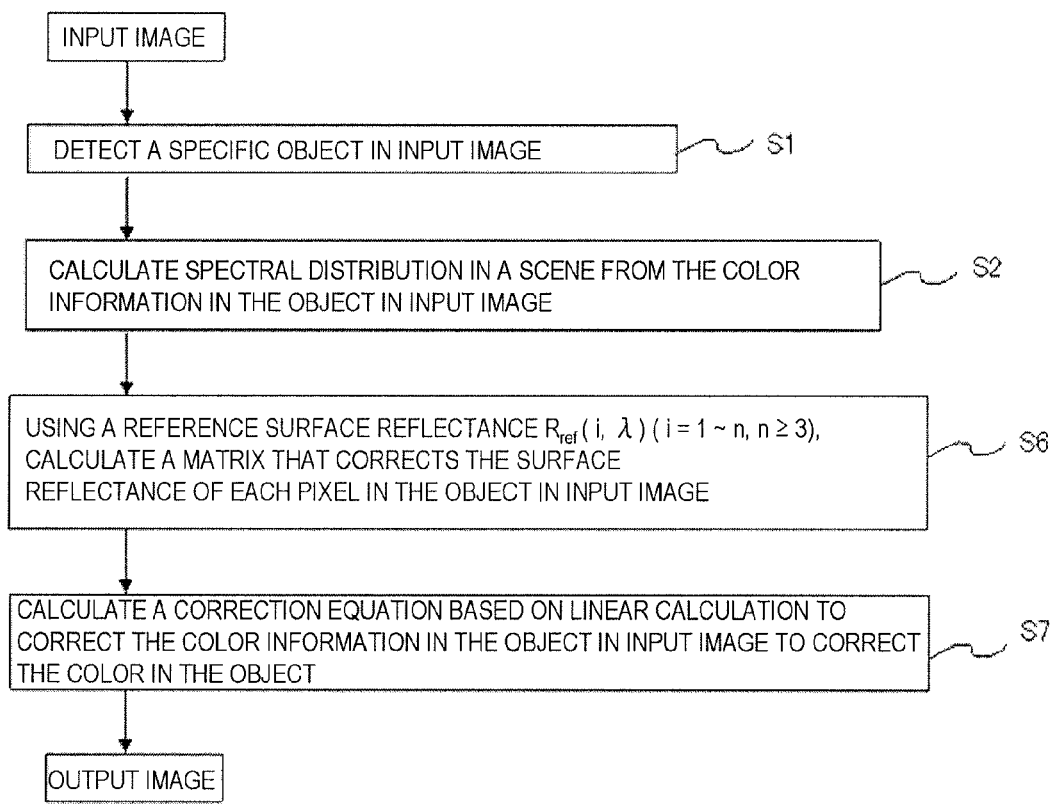
FIG. 7 is a flowchart for illustrating the sequence of operations of Example 2 of the color image processing method according to the present invention.

A color image processing method of a second exemplary embodiment of the present invention will now be described. FIG. 7 is a flowchart for illustrating the color image processing method of the second exemplary embodiment of the present invention. In the present exemplary embodiment, the processing carried out in the steps S3 to S5 in the first exemplary embodiment is replaced by a correction equation, which is based on linear calculation, in order to allow for obtaining the result of the correction equivalent to the result of the first exemplary embodiment. The processing of the steps S3 to S5 in the first exemplary embodiment is the processing of restoring the surface reflectance of each pixel in the object in the input image and correcting the so restored surface reflectance to calculate the corrected reproduction color.

The processing from the step S1 to the step S2 in FIG. 7 is the same as that of the steps S1 and S2 of FIG. 1. Hence, the explanation for those steps is dispensed with, and processing for the steps S6 and S7 will be described.

First, in the step S6, a matrix in the equation (6) in the step S4 is calculated, using the method for calculating the surface reflectance in the object region as stated in the step S3. This matrix, composed of 3-row by 3-column elements $m_{ij}$ (i, j=1~3), is used for correcting the surface reflectance in the object region.

In the step S7, a calculation equation, which is based on linear transformation to give the same result of calculations as the result of calculations of the corrected reproduction color obtained by the step S5, is constructed.

It is presumed that the spectral power distribution $I(\lambda)$ of the illumination when the input image is photographed has been restored in the step S2. It is further presumed that the surface reflectance $R(\lambda)$ of a certain pixel in the object region in the input image has been restored in the step S3. That is, the characteristic parameters $b_i$ (i=1~3), representing the object color, have been obtained.

In the above step S6, the 3×3 correction matrix for correcting the surface reflectance has been obtained. The characteristic parameter $b_i'$ (i=1~3) of the corrected surface reflectance $R'(\lambda)$ of the object may be calculated by the equation (6).

The corrected surface reflectance $R'(\lambda)$ may be calculated by substituting the characteristic parameters $b_i'$ (i=1~3) into the equation (4), and may be expressed by the following equation (8):

$$R'(\lambda) = r_0(\lambda) + b_1' r_1(\lambda) + b_2' r_2(\lambda) + b_3' r_3(\lambda) \quad (8)$$

The corrected tristimulus values X', Y' and Z' of the color of the object may be expressed by the following equation (9):

$$X' = \int I(\lambda) R'(\lambda) x(\lambda) d\lambda$$

$$Y' = \int I(\lambda) R'(\lambda) y(\lambda) d\lambda$$

$$Z' = \int I(\lambda) R'(\lambda) z(\lambda) d\lambda \quad (9)$$

If the equation (8) is substituted into the right side of the equation (9), and the expression is in the form of linear transformation, the following equation (10):

$$\begin{pmatrix} X' \\ Y' \\ Z' \end{pmatrix} = \begin{pmatrix} M(x, r_1) & M(x, r_2) & M(x, r_3) \\ M(y, r_1) & M(y, r_2) & M(x, r_3) \\ M(z, r_1) & M(z2r_1) & M(z, r_3) \end{pmatrix} \begin{pmatrix} b_1' \\ b_2' \\ b_3' \end{pmatrix} + \begin{pmatrix} M(x, r_0) \\ M(y, r_0) \\ M(z, r_0) \end{pmatrix} \quad (10)$$

is obtained.

In the above equation, $M(x, r_i)$ (i=1~3) represents a term of integration of $\int I(\lambda) r_i(\lambda) x(\lambda) d\lambda$. The same may apply for y and z.

From the equations (5) and (6), the equation (10) may be expressed by the following equation (11):

$$\begin{pmatrix} X' \\ Y' \\ Z' \end{pmatrix} = \begin{pmatrix} M(x, r_1) & M(x, r_2) & M(x, r_3) \\ M(y, r_1) & M(y, r_2) & M(x, r_3) \\ M(z, r_1) & M(z2r_1) & M(z, r_3) \end{pmatrix} \quad (11)$$

$$\begin{pmatrix} m_{11} & m_{12} & m_{13} \\ m_{21} & m_{22} & m_{23} \\ m_{31} & m_{32} & m_{33} \end{pmatrix} \begin{pmatrix} M(x, r_1) & M(x, r_2) & M(x, r_3) \\ M(y, r_1) & M(y, r_2) & M(x, r_3) \\ M(z, r_1) & M(z2r_1) & M(z, r_3) \end{pmatrix}^{-1}$$

$$\begin{pmatrix} X - M(x, r_0) \\ Y - M(y, r_0) \\ Z - M(z, r_0) \end{pmatrix} + \begin{pmatrix} M(x, r_0) \\ M(y, r_0) \\ M(z, r_0) \end{pmatrix}$$

The equation (11) may be simplified to an equation (12):

$$\begin{pmatrix} X' \\ Y' \\ Z' \end{pmatrix} = A \begin{pmatrix} X \\ Y \\ Z \end{pmatrix} + B \quad (12)$$

A matrix A is a 3×3 matrix represented by the following equation (13):

$$A = \begin{pmatrix} M(x, r_1) & M(x, r_2) & M(x, r_3) \\ M(y, r_1) & M(y, r_2) & M(x, r_3) \\ M(z, r_1) & M(z2r_1) & M(z, r_3) \end{pmatrix} \quad (13)$$

$$\begin{pmatrix} m_{11} & m_{12} & m_{13} \\ m_{21} & m_{22} & m_{23} \\ m_{31} & m_{32} & m_{33} \end{pmatrix} \begin{pmatrix} M(x, r_1) & M(x, r_2) & M(x, r_3) \\ M(y, r_1) & M(y, r_2) & M(x, r_3) \\ M(z, r_1) & M(z2r_1) & M(z, r_3) \end{pmatrix}^{-1}$$

A matrix B is a 3×1 matrix represented by the following equation (14), in which the matrices A and B both are constant matrices.

$$B = \begin{pmatrix} M(x, r_0) \\ M(y, r_0) \\ M(z, r_0) \end{pmatrix} - A \begin{pmatrix} M(x, r_0) \\ M(y, r_0) \\ M(z, r_0) \end{pmatrix} \quad (14)$$

If the equation (12) that corrects the color information is obtained, the tristimulus values X, Y and Z are calculated for the entire pixels in the object region in the input image and, using the equation (12), the corrected tristimulus values X', Y' and Z' are calculated.

Then, using the equation (7), the corrected R', G' and B' are obtained.

Figure 8:
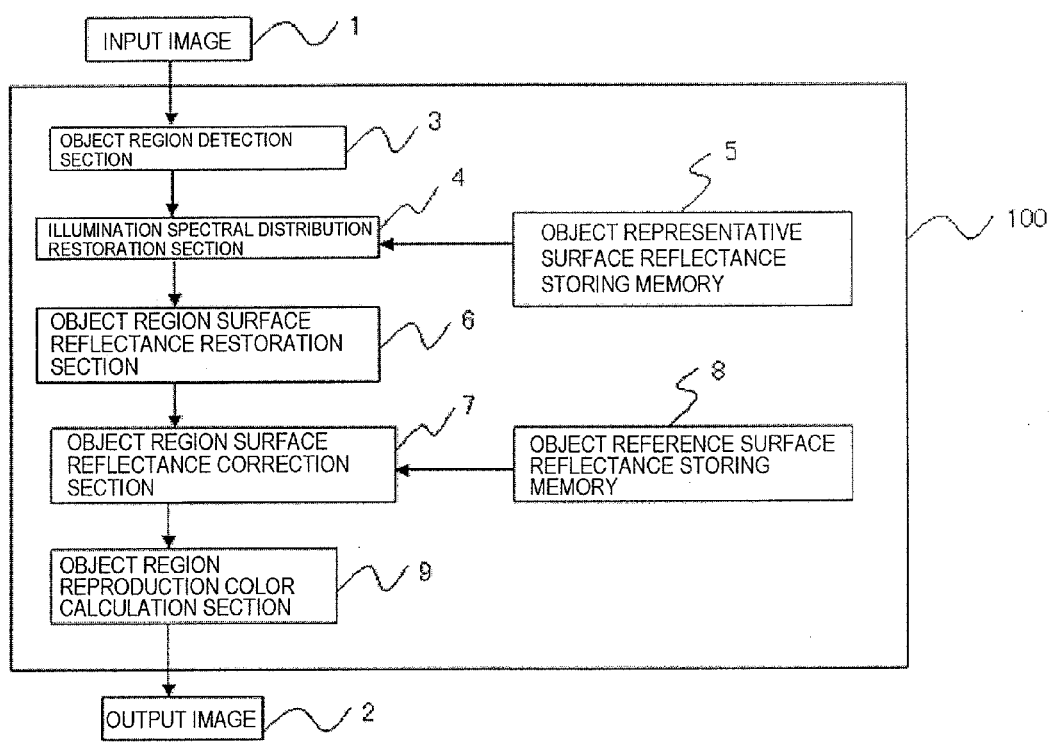
FIG. 8 is a diagram illustrating the configuration of a first exemplary embodiment of a color image processing apparatus according to the present invention.

A color collection device according to a first exemplary embodiment of the present invention will now be described. FIG. 8 shows a configuration of a first exemplary embodiment of the present invention.

A color image processing apparatus 100 corrects the color of an input image 1 to output an output image 2. The color image processing apparatus 100 includes an object region detection section 3, an illumination spectral power distribution restoration section 4, an object reference surface reflectance storing memory 5, an object region surface reflectance restoration section 6, an object region surface reflectance correction section 7, an object region reference surface reflectance storing memory 8, and an object reproduction color calculation section 9.

When supplied with the input image 1, the object region detection section 3 analyzes it and detects a presupposed specific object to output the information indicating a region of the object in the image. The object, detected from the input image 1, is such an object whose color, shape and so forth may be defined to a more or less extent, e.g., a human face, as described above. The method for detection may be any of those shown in the above mentioned techniques. If no object of interest may be detected from the input image 1, the input image 1 may be output as the output image 2.

The illumination spectral power distribution restoration section 4 restores the spectral power distribution of the illumination in the input image in accordance with the above mentioned method, using the color information in the object region detected by the object region detection section 3 and the representative surface reflectance of the object, stored in the object reference surface reflectance storing memory 5. The illumination spectral power distribution restoration section 4 executes the above mentioned processing corresponding to the processing of step S2 of FIG. 1.

From the spectral power distribution of the illumination restored, and from the pixel value of the input image, the object region surface reflectance restoration section 6 restores the surface reflectance of each pixel in the object region in accordance with the above mentioned method. The object region surface reflectance restoration section 6 executes the processing corresponding to the processing of the step S3 of FIG. 1 described above.

Using the three or more reference surface reflectances of the object, stored in the object reference surface reflectance storing memory 8, the object region surface reflectance correction section 7 corrects the restored surface reflectance of each pixel in the object region in accordance with the above mentioned method. The object region surface reflectance correction section 7 executes the processing corresponding to the above mentioned processing of the step S4 of FIG. 1.

The object region reproduction color calculation section 9 calculates the tristimulus values X, Y and Z, using the corrected surface reflectance of each pixel in the object region and the restored spectral power distribution of the illumination. In addition, the object region reproduction color calculation section 9 transforms the color of the output image into the device-dependent colors, such as, for example, RGB colors, to output the resulting image as an output image. The object region reproduction color calculation section 9 executes the processing corresponding to the above mentioned processing of the step S5 of FIG. 1.

The color image processing apparatus may be implemented by a computer. The component elements of the color image processing apparatus may be implemented as a program that causes a processor (CPU) of the computer to execute the above mentioned respective functions. These component elements are: the object region detection section 3 that detects the object region, the illumination spectral power distribution restoration section 4, the object representative surface reflectance storing memory 5, the object region surface reflectance restoration section 6, the object region surface reflectance correction section 7, the object region reference surface reflectance storing memory 8, and the object region reproduction color calculation section 9. The component elements of the color image processing apparatus may be implemented by a computer as a program not only in the first exemplary embodiment but also in other exemplary embodiment as well. According to the present invention, there is provided a computer-readable recording medium that stores the above program.

Figure 9:
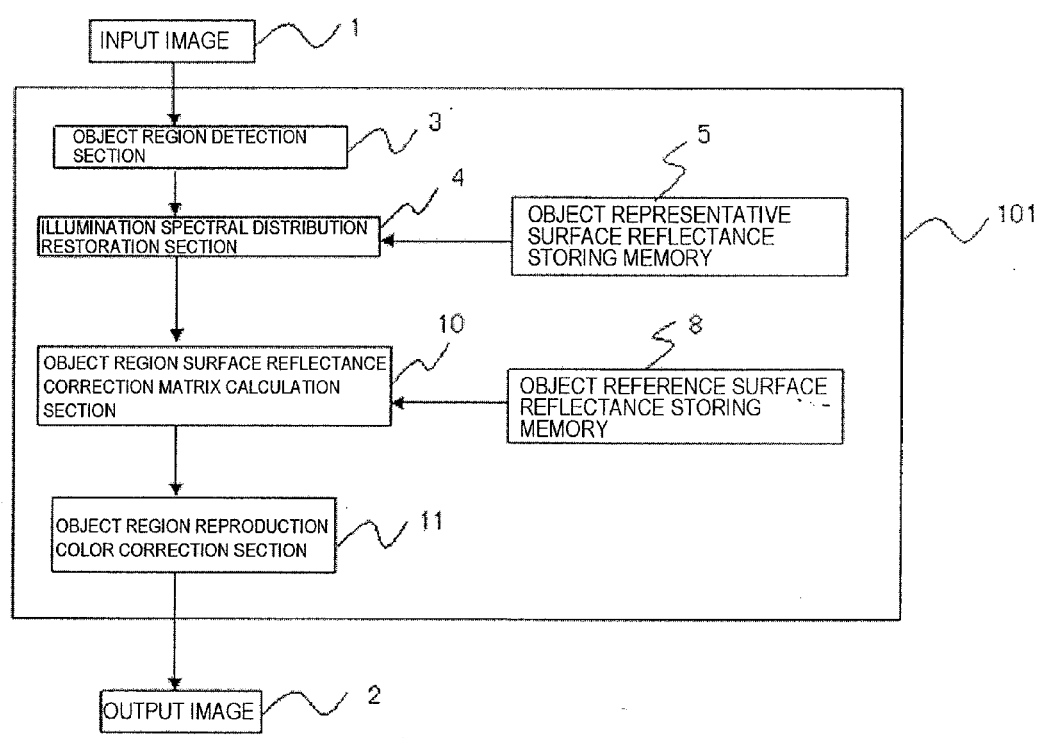
FIG. 9 is a diagram illustrating the configuration of a second exemplary embodiment of a color image processing apparatus according to the present invention.

FIG. 9 is a block diagram showing a configuration of a second exemplary embodiment of a color processing apparatus according to the present invention. A color image processing apparatus 101 of the present exemplary embodiment operates for correcting the color of the input image 1 to output an output image 2. Referring to FIG. 9, the color image processing apparatus 101 includes an object region detection section 3, an illumination spectral power distribution restoration section 4, an object representative surface reflectance storing memory 5, an object region surface reflectance correction matrix calculation section 10, an object reference surface reflectance storing memory 8, and an object region reproduction color correction section 11. The object region detection section 3 and the illumination spectral power distribution restoration section 4 are respectively the same as the object region detection section 3 and the illumination spectral power distribution restoration section 4 of FIG. 8.

The object region surface reflectance correction matrix calculation section 10 executes the above mentioned processing equivalent to that of the step S6 of FIG. 7.

That is, the object region surface reflectance correction matrix calculation section 10 calculates a correction matrix that corrects the surface reflectance of the object region and that is constituted by three rows by three columns of elements $m_{ij}$ (i, j=1~3) of FIG. 6.

The object region reproduction color correction section 11 executes the processing equivalent to that of the step S7 of FIG. 7. That is, the object region reproduction color correction section 11 creates the equation (11) that corrects the color of the object by way of performing the color correction. The object region reproduction color correction section 11 corrects the color of a pixel of the object region in accordance with the equation (11) formulated and then generates and outputs an output image 2.

Figure 10:
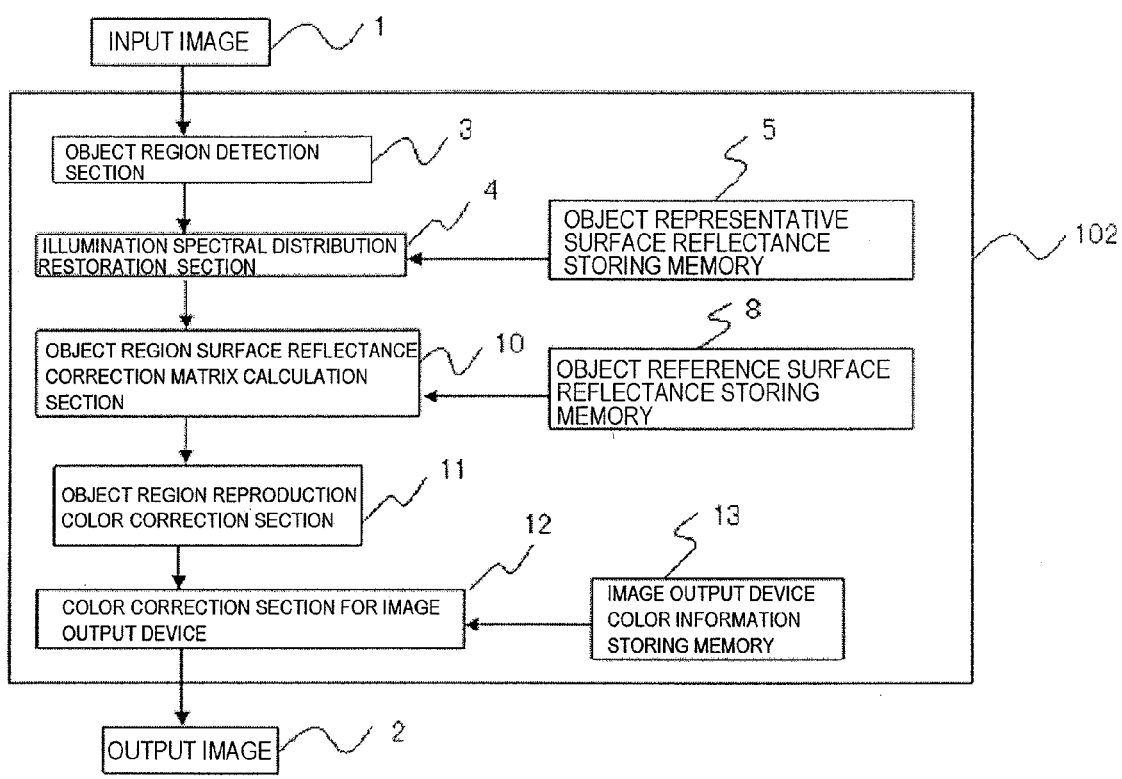
FIG. 10 is a diagram illustrating the configuration of a third exemplary embodiment of a color image processing apparatus according to the present invention.

FIG. 10 is a block diagram showing a third exemplary embodiment of a color image processing apparatus according to the present invention. Referring to FIG. 10, a color image processing apparatus 102 of the third exemplary embodiment of the present invention operates to correct the color of an input image 1 to output an output image 2.

The color image processing apparatus 102 includes an object region detection section 3, and an illumination spectral power distribution restoration section 4, an object representative surface reflectance storing memory 5 an object region surface reflectance correction matrix calculation section 10, an object reference surface reflectance storing memory 8, an object region reproduction color correction section 11, a color correction section 12 for an image output device, an image output device color information storing memory 13.

The object region reproduction color correction section 11 calculates the reproduction color of the object region, expressed by tristimulus values X, Y and Z, using the surface reflectance of each pixel in the object region corrected and the spectral power distribution of the illumination restored.

Using the color information of the image output device, stored in the image output device color information storing memory 13, the color correction section 12 for the image output device checks to see whether or not the reproduction color of the object region calculated is within the color range of the image output device. If the reproduction color of the object region calculated is outside the color range, such color is corrected so as to be within the color range of the image output device, and is outputted as the output image.

The present invention may be applied to the function of realization of color correction in the color image inputting/outputting device. The present invention may also be arranged as a program that is executed on a computer system for application as a color correction software or utility for an optional color image.

The particular exemplary embodiments may be modified or adjusted within the range of the entire disclosure of the present invention, inclusive of claims, based on the fundamental technical concept of the invention. Further, variegated combinations or selection of elements disclosed herein may be made within the framework of the claims. That is, the present invention may comprehend various modifications or corrections that may occur to those skilled in the art in accordance with and within the range of the entire disclosure of the present invention, inclusive of claim and the technical concept of the present invention.

The invention claimed is:

1. A color image processing method comprising:
   (a) restoring a surface reflectance of a region corresponding to an object which is a subset of the input image from color information of the object and from restored information on spectral power distribution of an illumination under which the input image was photographed; and
   (b) correcting the surface reflectance of the region so that the surface reflectance of the region approaches that of a pre-specified reference surface reflectance of the object in order to perform color correction to the region, but not the entire input image, and to generate a corrected output image as a function thereof, the correcting comprising:
      (i) determining matrix elements for a correction matrix that converts a set of characteristic parameters representing the surface reflectance in the region into a set of characteristic parameters representing the pre-specified reference surface reflectance of the region by solving simultaneous equations including the correction matrix for at least three colors;
      (ii) correcting the surface reflectance of the region of the object using the correction matrix composed of the determined matrix elements; and
   (c) outputting the corrected output image to an image device.

2. The color image processing method according to claim 1, further comprising detecting the region from the input image to extract the color information.

3. The color image processing method according to claim 1, comprising correcting, when the corrected color information of the object is outside a color range of an image output device, the color so as to be inside the color range of the image output device.

4. The color image processing method of claim 1, wherein the color correction is carried out on the region only.

5. A color image processing method, comprising:
   (a) generating a corrected output image from an input image, the generating comprising:
      (i) restoring a spectral power distribution of an illumination of the input image using color information in a region of an object, which is a subset of the entire input image, and a pre-specified reference surface reflectance of the object;
      (ii) restoring a surface reflectance in the region, based on the color information and the spectral power distribution of the illumination;
      (iii) correcting the surface reflectance of the region so that the surface reflectance of the region approaches that of a distribution of the pre-specified reference surface reflectance of the object, the correcting comprising wherein the correcting comprises:
         (a) determining matrix elements for a correction matrix that converts a set of characteristic parameters representing the surface reflectance of the region into a set of characteristic parameters representing the pre-specified reference surface reflectance by solving simultaneous equations including the correction matrix for at least three colors; and
         (b) correcting the surface reflectance of the region, but not the entire input image, using the correction matrix composed of the determined matrix elements and
      (iv) calculating color of the region from the spectral power distribution of the illumination and the corrected surface reflectance; and
   outputting the corrected output image to an image device.

6. The color image processing method according to claim 5, wherein the surface reflectance of the region is corrected so that the distribution of a characteristic parameter expressing the surface reflectance of the region in the object is made to approach to a distribution of a characteristic parameter expressing the pre-specified reference surface reflectance.

7. A color image processing method comprising:
   (a) generating a corrected output image from an input image, comprising:
      (i) restoring a spectral power distribution of an illumination using color information of a region corresponding to an object which is a subset of the input image and pre-specified reference surface reflectances of the object;
      (ii) calculating a matrix that corrects a surface reflectance of the object so that the surface reflectance of the region approaches a distribution of the pre-specified reference surface reflectance of the object, the matrix being calculated by at least determining matrix elements for a correction matrix that converts a set of characteristic parameters representing the surface reflectance of the region into a set of characteristic parameters representing the pre-specified reference surface reflectance of the object by solving simultaneous equations including the correction matrix for at least three colors;
      (iii) correcting the surface reflectance of the region, but not of the entire input image, using the correction matrix; and
      (iv) finding a correction equation which is based on linear calculation for correcting the color information in the object to correct the color information of the object; and
   outputting the corrected output image to an image device.

8. The color image processing method of claim 5, wherein correcting the surface reflectance is carried out on the region only.

9. The color image processing method according to claim 5, wherein the reference surface reflectance is determined by carrying out a subjective evaluation experiment.

10. The color image processing method according to claim 9, wherein the subjective evaluation experiment comprises testing at least three different surface reflectances of the region and choosing the reference surface reflectance as a function of one of the three different surface reflectances.

11. The color image processing method according to claim 7, comprising, in calculating the matrix that corrects the surface reflectance, making correction so that distribution of a characteristic parameter expressing the surface reflectance of the region is made to approach a distribution of a characteristic parameter expressing the pre-specified reference surface reflectance.

12. The color image processing method of claim 7, wherein correcting the surface reflectance is carried out only in the region.

13. The color image processing method according to claim 7, wherein the reference surface reflectance is determined by carrying out a subjective evaluation experiment.

14. The color image processing method according to claim 13, wherein the subjective evaluation experiment comprises testing at least three different surface reflectances of the region and choosing the pre-selected reference surface reflectance as a function of one of the three different surface reflectances.

15. A color image processing apparatus comprising:
(a) a section that restores a surface reflectance of a region of an object that is a subset of an input image from color information of the object and restored information on spectral power distribution of an illumination under which the input image was photographed, the object being a subset of the entire image; and
(b) a section that corrects the surface reflectance of the region so that the surface reflectance of the region approaches a pre-specified reference surface reflectance of the object to perform color correction on the region and to generate a corrected output image as a function thereof, the correcting of the surface reflectance comprising:
(i) determining matrix elements for a correction matrix that converts a set of characteristic parameters representing the surface reflectance of the region into a set of characteristic parameters representing the pre-specified reference surface reflectance of the region by solving simultaneous equations including the correction matrix for at least three colors; and
(ii) correcting the surface reflectance of the region, but not of the entire input image, using the correction matrix composed of the determined matrix elements; and
(c) an output for outputting the corrected output image to an input device.

16. The color image processing apparatus according to claim 15, further comprising an object region detection section that detects the region of the object from the input image to extract the color information thereof.

17. The color image processing apparatus according to claim 15, further comprising:
an image output device color information storing memory that stores color information of an image output device; and
a color correction section for an image output device which, if the corrected color information in the object is outside a color range of the image output device, corrects the color information so as to be inside the color range of the image output device.

18. The color image processing apparatus of claim 15, wherein the section that corrects the surface reflectance of the region corrects the surface reflectance of the region only.

19. The color image processing apparatus according to claim 15, wherein the selection of the pre-specified reference surface reflectance is determined by carrying out a subjective evaluation experiment.

20. The color image processing apparatus according to claim 19, wherein the subjective evaluation experiment comprises testing at least three different surface reflectances of the region and choosing the pre-selected reference surface reflectance as a function of one of the three different surface reflectances.

21. A color image processing apparatus which corrects an input image to generate a corrected output image, the apparatus comprising:
an object reference surface reflectance storing memory that stores a pre-specified reference surface reflectance of an object corresponding to a region which is a subset of the input image;
an illumination spectral power distribution restoration section that restores spectral power distribution of an illumination, using color information of the region corresponding to the object and the pre-specified reference surface reflectances of the object;
an object region surface reflectance restoration section that restores a surface reflectance of the region from the color information of the region and the spectral power distribution of the illumination;
an object region surface reflectance correction section that corrects the surface reflectance of the region, but not the entire input image, so that the surface reflectance of the region approaches a distribution of the pre-specified reference surface reflectance of the object, the reflectance correction section:
determining matrix elements for a correction matrix that converts a set of characteristic parameters representing the surface reflectance of the region into a set of characteristic parameters representing the pre-specified reference surface reflectance of the object by solving simultaneous equations including the correction matrix for at least three colors;
correcting the surface reflectance of the region using the correction matrix composed of the determined matrix elements, and
an object region reproduction color calculation section that calculates color of the region from the spectral power distribution of the illumination and the corrected surface reflectance; and
an output for outputting the corrected output image to an image device.

22. The color image processing apparatus according to claim 21, wherein the object region surface reflectance correction section corrects the surface reflectance of the region so that distribution of a characteristic parameter expressing the surface reflectance of the region is made to approach a distribution of a characteristic parameter expressing the pre-specified reference surface reflectance.

23. The color image processing apparatus according to claim 21, wherein three or more of the pre-specified reference surface reflectances of the object are stored in the object reference surface reflectance storing memory.

24. A color image processing apparatus that corrects an input image to generate a corrected output image, the apparatus comprising:
- an object reference surface reflectance storing memory that stores a pre-specified reference surface reflectance of an object which is a subset of the input image;
- an illumination spectral power distribution restoration section that restores spectral power distribution of an illumination, using color information of a region corresponding to the object and the pre-specified reference surface reflectance of the object;
- an object region surface reflectance correction matrix calculation section that calculates a matrix that corrects a surface of the region, the surface reflectance correction matrix calculation section calculating the matrix so that the surface reflectance of the region approaches a distribution of the pre-specified reference surface reflectance of the object, the correction matrix being determined by at least determining matrix elements for a correction matrix that converts a set of characteristic parameters representing the surface reflectance of the region into a set of characteristic parameters representing the pre-specified reference surface reflectance of the region object by solving simultaneous equations including the correction matrix for at least three colors;
- a surface reflectance correction section for correcting the surface reflectance of the region, but not the entire input image, using the correction matrix composed of the determined matrix elements;
- an object region reproduction color correction section that corrects the reproduction color of the region, the reproduction color correction section finding a correction equation that corrects the color information of the object based on linear calculation to correct the color information of the object; and
- an output for outputting the corrected output image to an image device.

25. The color image processing apparatus of claim 21, wherein the object region surface correction section corrects the surface reflectance of the region only.

26. The color image processing apparatus according to claim 24, wherein, in the surface reflectance correction matrix calculation section, the matrix correcting the surface reflectance realizes the correction in which distribution of a characteristic parameter representing the surface reflectance of the region is made to approach to distribution of a characteristic parameter representing the pre-selected reference surface reflectance.

27. The color image processing apparatus according to claim 24, wherein three or more pre-specified reference surface reflectances of the object are stored in the object reference surface reflectance storing memory.

28. The color image processing apparatus of claim 24, wherein the surface reflectance correction section only corrects the surface reflectance of the region.

29. A non-transitory computer-readable recording medium storing a program which, when run on a computer, causes the computer to execute:
- (a) a first processing that restores a surface reflectance of a region corresponding to an object which is a subset of an input image from color information in the object and from restored information on spectral power distribution of an illumination under which the input image was photographed; and
- (b) a second processing that corrects the surface reflectance of the region so that the surface reflectance of the region approaches a pre-selected reference surface reflectance of the object and that performs color correction to the object, but not the entire input image, in the input image to generate a corrected output image as a function thereof, the second processing comprising:
  - (i) determining matrix elements for a correction matrix that converts a set of characteristic parameters representing the surface reflectance of the region of the specific object into a set of characteristic parameters representing the pre-specified reference surface reflectance of the region by solving simultaneous equations including the correction matrix for at least three colors; and
  - (iii) correcting the surface reflectance of the region using the correction matrix composed of the determined matrix elements; and
- (c) outputting the corrected output image to an image device.

30. The non-transitory computer-readable recording medium according to claim 29, wherein the program causes the computer to execute a processing that detects the region from the input image to extract the color information.

31. The non-transitory computer-readable recording medium according to claim 29, wherein the program causes the computer to execute a processing that, when the corrected color information of the object is outside a color range of an image output device, correct the color information so as to be inside the color range of the image output device.

32. The non-transitory computer-readable recording medium of claim 29, wherein the second processing corrects the surface reflectance of the region only.

33. The non-transitory computer-readable recording medium according to claim 29, wherein the pre-selected reference surface reflectance is determined by carrying out a subjective evaluation experiment.

34. The non-transitory computer-readable recording medium according to claim 33, wherein the subjective evaluation experiment comprises testing at least three different surface reflectances of the region and choosing the pre-selected reference surface reflectance as a function of one of the three different surface reflectances.

35. A non-transitory computer-readable recording medium storing a program which, when run on a computer, causes the computer to correct an input image and generate an output image by executing:
- (a) a processing that restores spectral power distribution of an illumination using color information of a region of the input image corresponding to an object which is a subset of the input image and a pre-specified reference surface reflectance of the object;
- (b) a processing that restores a surface reflectance in the region from the color information and the spectral power distribution of the illumination;
- (c) a processing that corrects the surface reflectance of the region, but not the entire input image, so that the surface reflectance of the region approaches a distribution of the pre-specified reference surface reflectances reflectance of the object, the processing that corrects the surface reflectances of the object comprising:
  - (i) determining matrix elements for a correction matrix that converts a set of characteristic parameters representing the surface reflectance of the region into a set of characteristic parameters representing the pre-specified reference surface reflectance of the region by solving simultaneous equations including the correction matrix for at least three colors; and (ii) correcting the surface reflectance of the region, but not the entire input image, using the correction matrix composed of the determined matrix elements;

(d) a processing that calculates the color of the region, but not the entire input image, from the spectral power distribution of the illumination and from the corrected surface reflectance; and (e) a processing that outputs the corrected output image to an image device.

36. The non-transitory computer-readable recording medium according to claim 35, wherein the program causes the computer to execute a processing that corrects the surface reflectance of the region so that, in correcting the surface reflectance of the region, distribution of a characteristic parameter expressing the surface reflectance of the region is made to approach a distribution of a characteristic parameter expressing the pre-specified reference surface reflectance.

37. The non-transitory computer-readable recording medium of claim 35, wherein the correction of the surface reflectance is limited to the region.

38. The non-transitory computer-readable recording medium according to claim 35, wherein the pre-selected reference surface reflectance is determined by carrying out a subjective evaluation experiment.

39. The non-transitory computer-readable recording medium according to claim 38, wherein the subjective evaluation experiment comprises testing at least three different surface reflectances of the region and choosing the pre-selected reference surface reflectance as a function of one of the three different surface reflectances.

40. A non-transitory computer-readable recording medium storing a program which, when run on a computer, causes the computer to correct an input image and generate an output image by executing:

(a) a processing that restores spectral power distribution of an illumination using color information of a region corresponding to an object which is a subset of the input image and a pre-specified reference surface reflectance of the object;

(b) a processing that calculates a matrix which corrects a surface reflectance of the region to approach a distribution of pre-specified reference surface reflectance of the object, the process that calculates a matrix comprising determining matrix elements for a correction matrix that converts a set of characteristic parameters representing the pre-specified surface reflectance of the object into a set of characteristic parameters representing the reference surface reflectance of the region by solving simultaneous equations including the correction matrix for at least three colors;

(c) a processing that corrects the surface reflectance of the region, but not the entire input image, using the correction matrix;

(d) a processing that finds a correction equation which is based on linear calculation for correcting the color information of the object to correct the color information of the object; and (e) a processing that outputs the corrected output image to an image device.

41. The non-transitory computer-readable recording medium according to claim 40, wherein the matrix that corrects the surface reflectance realizes the correction in which distribution of a characteristic parameter expressing the surface reflectance of the region is made to approach to distribution of a characteristic parameter expressing the pre-specified reference surface reflectance.

42. The non-transitory computer-readable recording medium of claim 40, wherein the correction of the surface reflectance is limited to the region.

43. The non-transitory computer-readable recording medium according to claim 40, wherein the pre-selected reference surface reflectance is determined by carrying out a subjective evaluation experiment.

44. The non-transitory computer-readable recording medium according to claim 43, wherein the subjective evaluation experiment comprises testing at least three different surface reflectances of the region and choosing the pre-selected reference surface reflectance as a function of one of the three different surface reflectances.

* * * * *